United States Patent

McCallops et al.

[11] Patent Number: 5,614,774
[45] Date of Patent: Mar. 25, 1997

[54] AIR INDUCER FOR ELECTRIC POWER TOOL

[75] Inventors: John A. McCallops, Sayre; Kenneth J. Dubuque, Athens, both of Pa.

[73] Assignee: Ingersoll-Rand Company, Woodcliff Lake, N.J.

[21] Appl. No.: 401,373

[22] Filed: Mar. 9, 1995

[51] Int. Cl.[6] .......................................... H02K 9/00
[52] U.S. Cl. ........................ 310/58; 310/47; 310/50; 310/58; 415/208.1 EC
[58] Field of Search .................... 310/47, 50, 52, 310/58, 62, 63, 64, 65; 415/208

[56] References Cited

U.S. PATENT DOCUMENTS

| | | | |
|---|---|---|---|
| 2,730,635 | 1/1956 | McCabe | 310/50 |
| 2,776,385 | 1/1957 | Modrey | 310/50 |
| 3,439,204 | 4/1969 | Ponczek et al. | 310/50 |
| 3,515,498 | 6/1970 | Tomita | 415/208 |
| 3,546,502 | 12/1970 | Botefuhr et al. | 310/50 |
| 3,604,960 | 9/1971 | Krestel | 310/50 |
| 3,725,706 | 4/1973 | Lukens | 310/62 |
| 3,749,953 | 7/1973 | Baumann et al. | 310/62 |
| 4,128,778 | 12/1978 | Merkle et al. | 310/67 R |
| 4,184,804 | 1/1980 | Inagaki et al. | 415/213 R |
| 4,959,571 | 9/1990 | Yasumoto et al. | 310/67 R |
| 5,149,997 | 9/1992 | Suomela | 310/63 |
| 5,243,244 | 9/1993 | Kasberger et al. | 310/88 |
| 5,244,275 | 9/1993 | Bauer et al. | 366/314 |
| 5,311,089 | 5/1994 | Stroegen et al. | 310/50 |
| 5,315,193 | 5/1994 | Krummer et al. | 310/50 |

*Primary Examiner*—Thomas M. Dougherty
*Assistant Examiner*—Michael J. Wallace, Jr.
*Attorney, Agent, or Firm*—Walter C. Vliet

[57] ABSTRACT

An electric driven power tool motor is provided with a conical air inducer for improving the motor air cooling supply from a motor driven impeller.

5 Claims, 1 Drawing Sheet

AIR INDUCER FOR ELECTRIC POWER TOOL

BACKGROUND OF THE INVENTION

This invention relates generally to power tools and more particularly to an air cooling system for the motor of an electric motor driven power tool. In one known prior art tool, air was induced into the tool in a radially inward direction and thereafter sucked through a port into the eye of an impeller where it was radially accelerated and thereafter axially expelled in a peripheral cavity formed between the motor and the tool housing as a means of cooling the motor. The severe changes in air flow direction resulted in pressure and flow losses which reduced the cooling efficiency.

The foregoing illustrates limitations known to exist in present devices and methods. Thus it is apparent that it would advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing an air inducer for electric power tools comprising a circumferential housing having air supply ports therein for supplying a source of radial inward flow of air; a means for directing the radial inflow of air longitudinally to a longitudinal port disposed to direct the air to a radially inward portion of a rotating impeller; and wherein the air is expelled by the impeller and directed to cool an electric motor driving the tool.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
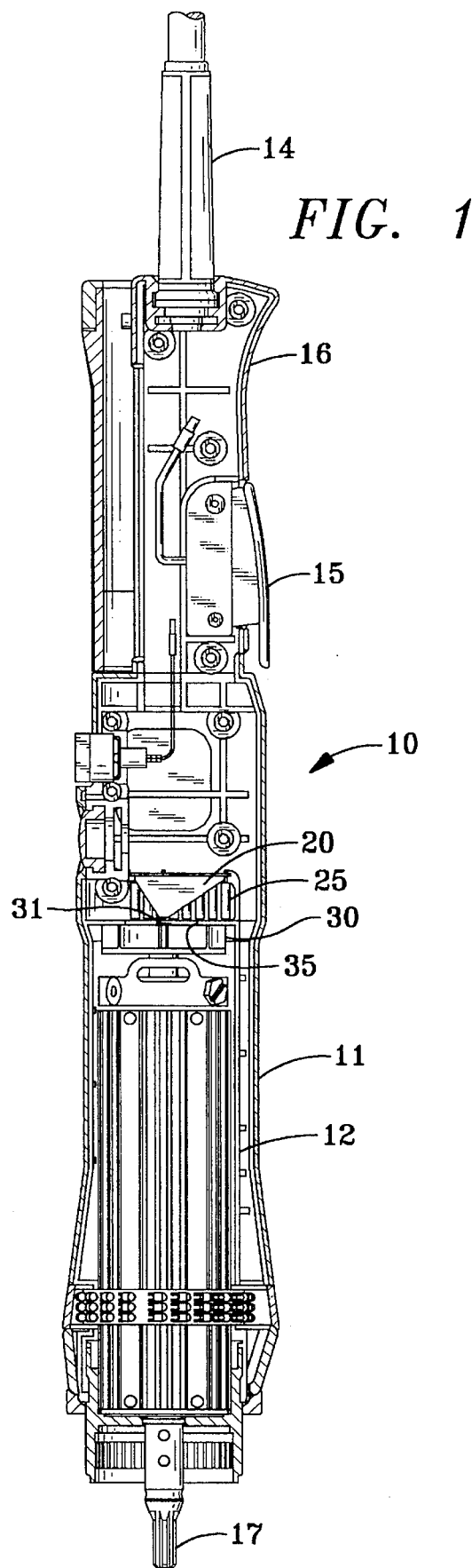
FIG. 1 is a cross sectional view of an electric driven power tool illustrating an embodiment of the present invention.
Figure 2:
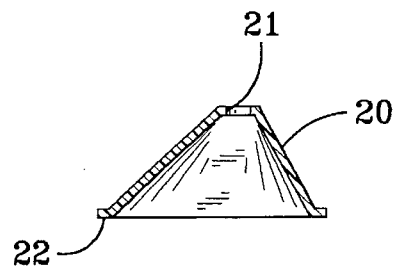
FIG. 2 is a cross section of an air inducer according to the present invention taken at Section 2—2 of FIG. 3.
Figure 3:
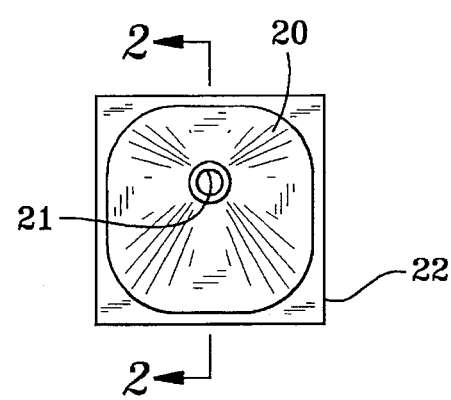
FIG. 3 is a plan view of an air inducer according to the present invention.
Figure 4:
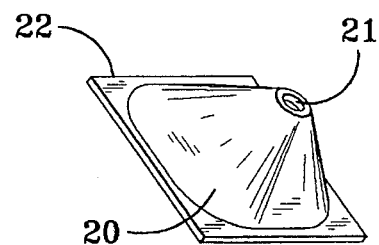
FIG. 4 is an isometric illustration of an air inducer according to the present invention.

Referring to FIG. 1, an electric driven power tool is shown and generally indicated by the reference numeral 10. The power tool is comprised of a housing 11 having a motor 12 therein. The motor may be of any suitable electric type requiring a flow of cooling air to maintain its temperature in operation. In the present embodiment a variable DC motor is shown which receives power from a power cord 14 through a throttle switch 15 and appropriate control circuitry which in part is illustrated but not further herein described. The motor 12 produces rotary work output on spindle 17. Typically, this may be used to drive a gear reducer and ultimately a screwdriver or nutrunner output.

As previously indicated, the motor requires a source of cooling air to maintain its temperature during extended operation. To accomplish this, according to the present invention, the tool housing 11 is provided with a plurality of openings 25 about its circumferential periphery. Cooling air drawn into the openings 25 progresses radially inward where it is drawn into the eye 31 of the impeller 30 after passing through an orifice 35. The impeller 30, which is mounted on the rotating shaft end of motor 12 and is rotated therewith (as seen in FIG. 1), then accelerates the air radially outward and then longitudinally forward over the surface of the motor 12 in the annular passageway formed between the motor 12 and housing 11 and thereafter ultimately exiting the housing through the power output end of the tool near spindle 17.

In similar arrangements in the prior art, the air being drawn in radially inward into the tool housing experienced an abrupt change in direction and severe turbulence near the eye 31 of the impeller 30. This severely reduced the efficiency of the impeller in producing the required air flow.

According to the present invention, a conical air inducer 20 is provided which assists in directing on its external surface the radially inward flow of air to a longitudinal flow through the orifice 35 and into the eye of the impeller 31. The smoother transition greatly increases the efficiency and output of air flow from the impeller.

The unique air inducer of the present invention is formed from a simple plastic cone which may be hot formed or stamped. According to the present invention it has been found convenient and efficient to form the cone with a square base 22 and an offset apex 21 atop an approximately 45 degree cone. Since the apex is offset, the angle of the cone varies somewhat from side to side. The square base provides an easy mounting for the cone. In the embodiment shown the offset permits alignment of the cone apex 20 with the eye 31 of the impeller and better accommodates the air flow pattern produced from the location of the opening or vent holes 25. An offset may also be beneficial in establishing a flow pattern into the impeller eye, particularly where the openings 25 are not symmetrically placed about the periphery of the housing.

Having described our invention in terms of a preferred embodiment, several modifications will occur to those skilled in the art. We therefore do not wish to be limited in the scope of the invention except as claimed.

What is claimed is:

1. An air inducer for an electric driven power tool having a motor and a motor shaft end mounted impeller driven air cooling supply comprising:

a circumferential housing having air supply ports circumferentially spaced about therein for supplying a source of radial inward flow of air;

a separate conical diaphragm insert adjacent said ports for redirecting said radial inflow of air longitudinally by an external formed surface thereof to a longitudinal orifice disposed to direct said air to a radially inward portion of said rotating impeller;

wherein said air is expelled by said impeller and directed to cool an electric motor driving the tool.

2. An air inducer for an electric driven power tool having an impeller driven air cooling supply according to claim 1 wherein: said conical diaphragm is positioned with its apex adjacent said longitudinal orifice.

3. An air inducer for an electric driven power tool having an impeller driven air cooling supply according to claim 2 wherein: said conical diaphragm is positioned with its apex aligned with the longitudinal axis of said motor.

4. An air inducer for an electric driven power tool having an impeller driven air cooling supply according to claim 2 wherein: said conical diaphragm approximates a 45 degree cone.

5. An air inducer for an electric driven power tool having an impeller driven air cooling supply according to claim 2 wherein: said conical diaphragm is formed of an offset cone having an apex offset from a perpendicular axis extending from the center of a rectangular base.

* * * * *